United States Patent [19]

Kido

[11] Patent Number: 5,086,252

[45] Date of Patent: Feb. 4, 1992

[54] THIN FILM ELECTROLUMINESCENCE DEVICE

[75] Inventor: Fusayoshi Kido, Yokohama, Japan

[73] Assignee: Kabushiki Kaisha Toshiba, Kawasaki, Japan

[21] Appl. No.: 451,874

[22] Filed: Dec. 18, 1989

[30] Foreign Application Priority Data

Dec. 27, 1988 [JP] Japan ................................ 63-327558

[51] Int. Cl.$^5$ ........................ H01J 1/62; C09K 11/08
[52] U.S. Cl. ................................. 313/503; 313/509; 252/301.4 H; 340/781
[58] Field of Search .............. 313/503, 509, 484, 486, 313/495, 586; 252/301.4 H, 301.4 R; 340/781; 350/350 F, 357

[56] References Cited

U.S. PATENT DOCUMENTS

| 4,048,533 | 9/1977 | Hinson et al. | 313/484 |
| 4,126,807 | 11/1978 | Wedding et al. | 313/586 |
| 4,278,913 | 7/1981 | Kagami et al. | 313/495 |
| 4,442,377 | 4/1984 | Higton et al. | 313/509 |
| 4,670,355 | 6/1987 | Matsudaira | 313/509 |
| 4,869,973 | 9/1989 | Nishikawa et al. | 313/503 |
| 4,879,493 | 11/1989 | Mastuno et al. | 313/486 |
| 4,894,548 | 1/1990 | Takahashi et al. | 252/301.4 H |
| 4,926,047 | 5/1990 | Takahashi et al. | 252/301.4 H |
| 4,940,315 | 7/1990 | Demiryont | 350/357 |

OTHER PUBLICATIONS

Phosphor Handbook, Ed., Phosphor Research Society, OHMSHA. Ltd., 1987 (p. 119).
Phosphor Handbook, Ed., Phosphor Research Society, OHMSHA, Ltd., 1987 (pp. 294–295).

Primary Examiner—Donald J. Yusko
Assistant Examiner—John Giust
Attorney, Agent, or Firm—Oblon, Spivak, McClelland, Maier & Neustadt

[57] ABSTRACT

A thin film electroluminescence device is disclosed which comprises an electrode formed on a transparent substrate, one dielectric layer formed on the electrode, an emitting layer composed of a fluoride compound of the alkaline earth metal as a host material and element ions added as a luminescence center to the host material formed on the dielectric layer, the other dielectric layer formed on the emitting layer, the other electrode provided on the other dielectric layer.

6 Claims, 1 Drawing Sheet

THIN FILM ELECTROLUMINESCENCE DEVICE

BACKGROUND OF THE INVENTION

1. Field of the Invention

The present invention relates to a thin film electroluminescence device (TFEL) for use, for example, in an edge emitter of a printer head and, in particular, to a thin film electroluminescence device having an emitting layer of an improved composition.

2. Description of the Reated Art

Generally, a TFEL device comprises a transparent substrate such as a glass plate, one electrode formed on the transparent substrate, an emitting layer sandwiched with two dielectric layers, and the other electrode. The emitting layer is conventionally composed of a host material and a luminescence center as given below:

TABLE 1

| Host material | Luminescence Center | | | |
|---|---|---|---|---|
| | red | green | blue | bluish green |
| ZnS | $Sm^{3+}$ | $Tb^{3+}$ | $Tm^{3+}$ | |
| CaS | | $Tb^{3+}$ | | $Ce^{3+}$ |
| SrS | $Sm^{3+}$ | | | $Ce^{3+}$ |

In the aforementioned TFEL device, when a high electric field of a few MV/cm is applied to the emitting layer upon the application of a voltage between the associated electrodes, electrons are implanted into the emitting layer. At this time, the electrons are accelerated there under the aforementioned high electric field and hot electrons are generated. The hot electrons migrate in the crystal of the host material of the emitting layer, causing them to directly collide with the element ions acting as the luminescence center present in the host material or causing the energy of the hot electrons to be propagated through the crystal lattice of the host material to allow element ions to be excited. As a result, a light emission phenomenon appears.

However, the conventional TFEL device suffers from the following problem. That is, blue light of high colorimetric purity is difficult to produce in the TFEL device having an emitting layer with ZnS as a host material. This is caused by the shifting of an emission spectrum toward a longer wavelength edge because the radius of positive ions ($Zn^{2+}$) of the host material ZnS is smaller than that of the lanthanide ions such as $Ce^{3+}$ which act as a luminescence center. In the TFEL device having an emitting layer with the alkaline-earth metal's sulfide, such as CaS and SrS, as a host material, it is possible to produce bluish green light since the radius of positive ions ($Ca^{2+}$, $Sr^{2+}$) in the host material is nearly equal to that of lanthanide element ions such as $Ce^{3+}$ which serve as a blue luminescence center. Because of the deliquescence of the alkaline earth metal's sulfide such as CaS and SrS, the emitting layer having such sulphide as the host material reveals a poor stability and an increased aging.

"Phosphor Handbook" Ed, Phosphor Research Society, OHMSHA, LTD, 1978 (p.119) contains a description about the luminescence of $CaF_2$; $Sm^{2+}$, $SrF_2$; $Sm^{2+}$ and $BaF_2$; $Sm^{2+}$. The aforementioned Handbook (pp. 294 to 295) also contains a study on a scintilate phosphor having a peak at 435 nm in a light emission spectrum concerning $CaF_2$; $Eu^{2+}$.

SUMMARY OF THE INVENTION

An object of the present invention is to provide a thin film electroluminescence device having an emitting layer of high stability in the outer atmosphere and of less aging which employs the alkaline earth metal's fluoride compound as a host material.

Another object of the present invention is to provide a thin film electroluminescence device capable of producing blue luminescence in high colorimetric purity essential to the obtainment of full color due to the nearness of the radius of the positive ions ($Ca^{2+}$, $Sr^{2+}$ etc.) of the alkaline earth metal's fluoride compound (host material) to the radius of the element ions acting as a blue luminescence center.

According to the present invention, a thin film electroluminescence device comprises an emitting layer composed of the alkaline earth metal's fluoride compound as a host material and element ions in the host material which act as a luminescence center; a dielectric layer formed on each surface of the emitting layer or one surface of the emitting layer; one electrode formed on the emitting layer or on one dielectric layer; and the other electrode provided on the other dielectric layer.

DETAILED DESCRIPTION OF THE INVENTION

Figure 1:
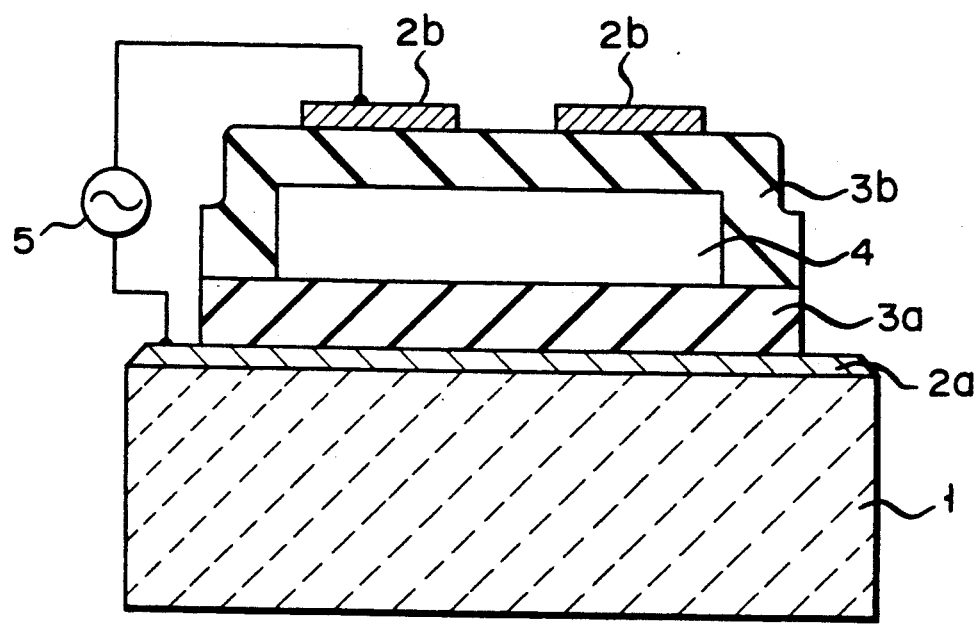
FIG. 1 a cross-sectional view showing a thin film electroluminescence device according to the present invention.

A TFEL device according to the present invention will be explained below in more detail with reference to FIG. 1.

One electrode $2a$ is formed on a transparent substrate 1 and one dielectric layer $3a$ covers the electrode $2a$. An emitting layer 4 is formed on the dielectric layer $3a$. The other dielectric layer $3b$ is formed on the dielectric layer $3a$ to cover the emitting layer 4. The other electrode $2b$ is formed on the other dielectric layer $3b$. A power source 5 is connected across the electrodes $2a$ and $2b$ to apply a high electric field to the emitting layer.

The transparent substrate 1 is formed of, for example, glass.

One (for example, $2a$) of the electrodes $2a$, $2b$ which is located on the transparent substrate side is formed of a transparent conductive material such as ITO. The other electrode (for example, $2b$) is formed of an ordinary conductive material such as aluminum and copper.

The dielectric layers $3a$, $3b$ are formed of $Ta_2O_5$, $Y_2O_3$, $Al_2O_3$, $Si_3N_4$, SiAlON, $TiO_2$, $SiO_2$, $ZrO_2$, $Nb_2O_5$, $BaTiO_3$, $PbTiO_3$ and $HfO_2$. It is to be noted that the dielectric layer may not necessarily be provided on each surface of the emitting layer 4 and may be provided only on one surface of the emitting layer 4. I this case, either one of these two electrodes is located directly on the surface of the emitting layer 4.

The emitting layer 4 is composed of a fluoride of the alkaline earth metal as a host material containing element ions as a luminescence center.

As the fluoride compound of the alkaline earth metal serving as the host material of the emitting layer 4, use may be made of, for example, $CaF_2$, $SrF_2$ and $BaF_2$ and, in particular, $CaF_2$ and $SrF_2$ both of which are effective in ease in handling.

As element ions acting as a luminescence center in the emitting layer 4, use may be made of, for example, $Bi^{3+}$ and the lanthanide elements $Tb^{3+}$, $Tm^{3+}$, $Sm^{3+}$, $Pr^{3+}$, $Ce^{3+}$ and $Eu^{2+}$. Of these, $Eu^{2+}$, $Ce^{3+}$, $Tm^{3+}$ and $Bi^{3+}$ can be employed as element ions acting as a blue luminescence center. In particular, $Eu^{2+}$ is effective to blue luminescence in high colorimetric purity. Not only a matching between the positive ion radius of the host material and that of the element ions acting as a luminescence center but also a choice in the kinds of negative ions of the host material exerting an influence on the energy level, for example, are essential to the blue luminescence in high colorimetric purity. Since $Eu^{2+}$ is nearer in radius to positive ions ($Ca^{2+}$, $Sr^{2+}$, etc.) of the host material, that is, a fluoride compound of the alkaline earth metal, an emission spectrum is obtained having a peak in a blue wavelength region. At the same time, the energy level is raised in its relation to F-, the negative ion of the host material, causing blue emission in high colorimetric purity. A ratio between the element ions acting as the blue luminescence center and the host materials $CaF_2$, $SrF_2$ and $BaF_2$ is preferably within a range of 0.05 to 2 wt. % for $Eu^{2+}$, 0.01 to 2 wt. % for Ce3, 0.01 to 0.3 wt. % for Tm and 0.03 to 1 wt. % for $Bi^{3+}$.

The emitting layer 4 is formed as a film by virtue of a sputtering method. Stated in more detail, the emitting layer is provided by preparing, through a reaction of a fluoride compound of the alkaline earth metal (that is, the host material) with the element ion compound (that is, the luminescence center), a powdered mass containing the element ions (luminescence center) in its host material sintering it to provide a sintered body as a target. The sputtering is performed in an inert gas atmosphere such as helium, neon and argon or in an atmosphere of a mixed gas containing flon such as $CF_4$ in the aforementioned inert gas. Since an emitting layer can be formed at a lower temperature, it is possible to employ glass of low heat resistance as the substrate. By, in particular, the addition of the flon-series gas, it is possible to compensate for an escape of F which is produced by the sputtering in the thin film. The upper limit of the mixed ratio for the flon-seried gas is about 1.2 times at max. against the inert ga which is used together with the flon-series gas. The reason is that, for the upper limit exceeding that figure, a film formation speed (the sputtering rate) is markedly decreased.

In the TFEL device of the present invention, a very high electrical resistivity is held by using the fluoride compound of the alkaline earth metal as the host material of the emitting layer. As a result, even if the device is made as a thin film unit, it is possible to apply a high voltage across the electrodes, without forming any auxiliary layers on the thin film unit, and to obtain a high-brightness TFEL device.

DESCRIPTION OF THE EMBODIMENTS

Examples of the present invention will now be explained below with reference to FIG. 1.

EXAMPLE 1

After adding $Eu_2O_3$ to $CaF_2$ in a 0.5 wt. % ratio, the resultant structure was heated, in a flow of a forming gas ($N_2:H_2=1:0.1$), at a temperature of 1200° C. for 2 hours to obtain powdered $CaF_2$:Em. The powder was hot pressed at 1370° C. in an $N_2$ gas atmosphere to obtain a sintered body as a target of a $CaF_2$:Em composition as used in the present invention.

A 1700 Å-thick transparent ITO electrode (one electrode) 2a and 4000 to 5000 Å-thick $Ta_2O_5$ dielectric layer 3a (one dielectric layer) 3a were sequentially formed over a transparent substrate 1 formed of glass. Then magnetron sputtering was performed in an Ar atmosphere on the target which was the sintered body of the aforementioned $CaF_2$:Eu composition. By so doing, a 4000 to 4500 Å-thick emitting layer 4 was formed on the dielectric layer 3a so as to have a composition of $CaF_2$ (host material) and 0.2 wt. % of $Eu^{2+}$ (luminescence center).

Then a 4000 to 5000 Å-thick $Ta_2O_5$ dielectric layer 3b was formed on the dielectric layer 3a with the emitting layer 4 surrounded therewith and an aluminum electrode 2b was formed, as the other electrode, on the dielectric layer 3b to obtain a thin film electroluminescence (TFEL) device as shown in FIG. 1.

In the TFEL device, a voltage 120 Vrms was applied across the electrodes 2a and 2b from the power source at a frequency (sine wave) of 500 Hz. As a result, a blue light emission was observed having a peak of 427 nm wavelength and a luminance of 35 cd/m². Further, the TFEL device was allowed to stand in the atmosphere for 1000 hours and a voltage was impressed across the electrodes 2a and 2b under the same condition as set forth above, revealing a blue light emission of a similar luminance.

EXAMPLE 2

A TFEL device was manufactured by the same method as set forth in Example 1 except that magnetron sputtering was performed in an Ar:$CF_4$=1:1 atmosphere on a target, that is, a sintered body of a $CaF_2$:Bi composition to form, on the dielectric layer, a 4000 to 4500 Å-thick emitting layer of a composition of a $CaF_2$ host material and 0.05 wt. % of $Bi^{3+}$.

In the TFEL device, a voltage 120 Vrms was applied across the electrodes 2a and 2b from the power source 5 at a frequency (sine wave) of 500 Hz. As a result, a blue light emission was observed having a peak of 449 nm wavelength and a luminance 8 cd/m². Further, the TFEL device was allowed to stand in the atmosphere for 1000 hours and a voltage was applied across the electrodes 2a and 2b. It has been found that the device produces blue luminescence.

EXAMPLE 3

A TFEL device was manufactured as shown in FIG. 1 by the same method as set forth above except that magnetron sputtering was performed in an Ar atmosphere on a target, that is, a sintered body of an $SrF_2$:Eu composition to form, on the dielectric layer, a 4000 to 4500 Å-thick light emitting layer of a composition of an $SrF_2$ host material and 0.15 wt. % of $Eu^{2+}$.

In the TFEL device of Example 3, a voltage 120 Vrms was applied across the electrodes 2a and 2b from the power source 5 at a frequency (sine wave) of 500 Hz. As a result, a blue light emission was observed having a peak of 422 nm wavelength and a luminance of 46 cd/m² It has been found that blue luminescence of high purity is produced at that time. Further, the TFEL device was allowed to stand in an atmosphere for 1000 hours and produced blue luminescence of high colorimetric purity upon the application of a voltage between the electrodes 2a and 2b under the same conditions as set forth above. A similar light emission was confirmed.

EXAMPLE 4

A TFEL device as shown in FIG. 1 was manufactured by the same method as in Example 1 except that magnetron sputtering was performed in an Ar atmosphere on a target, that is, a sintered body of a $CaF_2$:Tb composition to form a 4000 to 4500 Å-thick emitting layer on the dielectric layer. In this case, the emitting layer was so formed as to have a composition of a $CaF_2$ host material and 2 wt. % of $Tb^{3+}$ acting as a luminescence center.

In the TFEL device shown in Example 4, a voltage of 120 Vrms was applied across both the electrodes from the power source 5 at a frequency (sine wave) of 500 Hz. It has been found that the device produces green luminescence having a main peak of 544 nm wavelength and a luminance of 73 cd/m$^2$. Further, the TFEL device was allowed to stand in the atmosphere for 100 hours and a voltage was applied between the electrodes 2a and 2b under the same conditions as set forth above. It has been found that the device produces similar green luminescence of high colorimetric purity.

EXAMPLE 5

A TFEL device of FIG. 1 was manufactured by the same method as set forth in Example 1 except that magnetron sputtering was performed in an Ar atmosphere on a target, that is, a sintered body of a $CaF_2$:Sm composition, to form an emitting layer on the dielectric layer. In this case, the emitting layer is so formed as to have a composition of a $CaF_2$ host material and 0.5 wt. % of $Sm^{3+}$ serving as a luminescence center.

A voltage of 120 Vrms was applied across both the electrodes from the power source 5 at a frequency (sine wave) of 500 Hz in the TFEL device shown in Example 5. It has been found that the device produces reddish orange luminescence having a main peak of 575 nm wavelength and a luminance of 52cd/m$^2$. Further, the TFEL device was allowed to stand in the atmosphere for 1000 hours and a voltage was applied across the electrodes 2a and 2b under the same conditions as set forth above. It has been found that the device produces similar luminescence of high colorimetric purity.

EXAMPLE 6

A TFEL device was manufactured in the same method as in Example 1, except that magnetron sputtering was performed, in an Ar atmosphere, on a target, that is, a sintered body of $CaF_2$:Ce to form, on a dielectric layer, a 4000 to 4500 Å-thick emitting layer of a composition of a $CaF_2$ host material and 0.08 wt. % of $Ce^{3+}$ as a luminescence center.

In the TFEL device, a voltage 120 Vrms was applied across electrodes 2a, 2b from the power source 5 under a frequency (sine wave) of 500 Hz. As a result, bluish green light emission was observed having two peaks of 467 nm and 503 nm wavelengths and a luminance of 3 cd/m$^2$. Further, after the TFEL device was allowed to stand in an atmosphere for 1000 hours, voltage was applied across the electrodes 2a, 2b under the same condition as set forth above and a similar light emission was confirmed.

EXAMPLE 7

A TFEL device was manufactured in the same way as in Example 1, except that magnetron sputtering was performed, in an Ar atmosphere, on a target, that is, a sintered body of an $SrF_2$:Bi to form, on a dielectric layer, a 4000 to 4500 Å-thick emitting layer of a composition of an $SrF_2$ host material and 0.06 wt. % of $Bi^{3+}$ as a luminescence center.

In the TFEL device, a voltage 120 Vrms of the power source was applied across the electrodes 2a, 2b under a frequency (sine wave) of 500 Hz. As a result, blue light emission was observed having a peak of a 451 nm wavelength and a luminance 6 cd/m$^2$. Further, after the TFEL device was allowed to stand for 1000 hours, voltage is applied across the electrodes 2a, 2b under the same condition, revealing similar light emission.

EXAMPLE 8

A TFEL device was manufactured in the same method as in Example 1, except that magnetron sputtering was performed in an Ar:$CF_4$l =1:0.8 atmosphere on a target, that is, a sintered body of a composition $SrF_2$:Tb to form, on a dielectric layer, a 4000 to 4500 Å-thick emitting layer of a $SrF_2$ host material and 2.3 wt. % of $Tb^{3+}$ as a luminescence center.

In the TFEL device, a voltage 120 Vrms of the power source 5 was applied across the electrodes 2a, 2b under a frequency (sine wave) of 500 Hz. As a result, green light emission was observed having a main peak of 550 nm wavelength and a luminance 90 cd/cm$^2$. After the TFEL device was allowed to stand in an atmosphere for 1000 hours, voltage was applied across the electrodes 2a, 2b under the same conditions, producing similar light emission.

EXAMPLE 9

A TFEL device was manufactured in the same method as in Example 1 except that magnetron sputtering was performed, in an Ar atmosphere on a target, that is, a sintered body of a composition $SrF_2$:Sm to form, on a dielectric layer, a 4000 to 4500 Å-thick emitting layer of an $SrF_2$ host material and 0.4 wt. % of $Sm^{3+}$.

In the TFEL device, a voltage 120 Vrms was applied across the electrodes 2a, 2b from the light source 5 under a frequency (sine wave) of 500 Hz. As a result, reddish orange light emission was observed having a main peak of 580 nm wavelength and a luminance 60 cd/m$^2$ Further, after the resultant TFEL device was allowed to stand in an atmosphere for 1000 hours, voltage was applied across the electrodes 2a, 2b under the same condition, revealing similar light emission.

As set fourth above, the present invention provides a thin film electroluminescence device which includes an emitting layer of high reliability in the outer atmosphere and of less aging where the alkaline earth metal's fluoride compound is used as a host material and which can produce blue luminescence in high colorimetric purity essential to the obtainment of full color due to the nearness of the radius of the host material's positive ions ($Ca^{2+}$, $Sr^{2+}$) to the radius of the element ions acting as a blue luminescence center.

What is claimed is:

1. A thin film electroluminescence device comprising:
   an emitting layer composed of a host material and lanthanide element ions added as a luminescence center in the host material, said host material being a fluoride compound of an alkaline earth metal selected from the group consisting of $CaF_2$, $SrF_2$ and $BaF_2$, the emitting layer having first and second opposite surfaces;

a dielectric layer formed on each surface, or one surface, of the emitting layer;

one electrode provided on an emitting layer surface or on said dielectric layer; and another electrode provided on the opposite emitting layer surface or the opposite dielectric layer.

2. The device according to claim 1, wherein the fluoride compound of said alkaline earth metal is $CaF_2$.

3. The device according to claim 1, wherein the fluoride compound of said alkaline earth metal is $SrF_2$.

4. The device according to claim 1, wherein said lanthanide element ions are europium (Eu) ions.

5. The device according to claim 1, wherein said dielectric layer si $Ta_2O_5$.

6. A full-color display device comprising, in combination, a blue emitting TFEL unit having an emitting layer composed of a fluoride compound of an alkaline earth metal as a host material and an element ion serving as a luminescence center, the fluoride compound of an alkaline earth metal being selected from the group consisting of $CaF_2$, $SrF_2$ and $BaF_2$, the element ion being one member selected from the group consisting of $Eu^{2+}$, $Ce^{3+}$, and $Tm^{3+}$;

a green emitting TFEL unit; and a red emitting TFEL unit.

* * * * *